(12) United States Patent
Giusti et al.

(10) Patent No.: US 9,895,990 B2
(45) Date of Patent: Feb. 20, 2018

(54) METHOD FOR PROGRAMMING ENERGY FLOW BETWEEN A GRID AND AN ACCUMULATOR OF AN ELECTRIC VEHICLE, AND CORRESPONDING DEVICE FOR PROGRAMMING

(71) Applicant: Alpiq Intec AG, Olten (CH)

(72) Inventors: Alessandro Giusti, Lugano (CH); Matteo Salani, Pandino (IT); Andrea Emilio Rizzoli, Vacallo (CH); Luca Maria Gambardella, Tradate (IT); Gian Carlo Dozio, Cademario (CH); Fabio Foletti, Manno (CH); Davide Rivola, Bellinzona (CH); Roman Rudel, Massagno (CH); Marco Piffaretti, Rovio (CH); Giorgio Gabba, Varese (IT); Marco Belliardi, Lugano (CH); Lorenzo Nespoli, Lugano (CH); Vasco Medici, Stabio (CH)

(73) Assignee: Innosense AG, Zurich (CH)

( * ) Notice: Subject to any disclaimer, the term of this patent is extended or adjusted under 35 U.S.C. 154(b) by 153 days.

(21) Appl. No.: 14/914,853

(22) PCT Filed: Aug. 27, 2014

(86) PCT No.: PCT/EP2014/068173
§ 371 (c)(1),
(2) Date: Feb. 26, 2016

(87) PCT Pub. No.: WO2015/028509
PCT Pub. Date: Mar. 5, 2015

(65) Prior Publication Data
US 2016/0214489 A1    Jul. 28, 2016

(30) Foreign Application Priority Data
Aug. 27, 2013  (EP) .................................. 13181909

(51) Int. Cl.
*B60L 11/18* (2006.01)
*G06N 5/04* (2006.01)
(Continued)

(52) U.S. Cl.
CPC .............. *B60L 11/184* (2013.01); *B60L 3/12* (2013.01); *B60L 11/1816* (2013.01);
(Continued)

(58) Field of Classification Search
CPC ... B60L 11/184; B60L 11/1816; G06N 7/005; G06N 5/04
(Continued)

(56) References Cited

U.S. PATENT DOCUMENTS 9,597,975 B2 *  3/2017  Ito et al. ................... B60L 3/12
2008/0203973 A1  8/2008  Gale et al.
(Continued)

FOREIGN PATENT DOCUMENTS

EP       2 784 897 A1    10/2014
WO    2011/009129 A1     1/2011
WO    2013/076957 A1     5/2013

OTHER PUBLICATIONS

International Search Report issued in corresponding application No. PCT/EP2014/068173 dated Dec. 11, 2014.
(Continued)

*Primary Examiner* — Sun Lin
(74) *Attorney, Agent, or Firm* — Carter, Deluca, Farrell & Schmidt, LLP

(57) ABSTRACT

A method for recharging an accumulator of an electric vehicle is disclosed, the method including recording information on past usages of the accumulator locally at a point of connection of the accumulator to a grid; locally estimating information on a future usage of the accumulator, taking in input the information on past usages; and locally pro-
(Continued)

gramming an energy flow between the grid and the accumulator based on the estimated information.

16 Claims, 6 Drawing Sheets

(51) Int. Cl.
    *G06N 7/00*     (2006.01)
    *B60L 3/12*     (2006.01)
    *G05D 23/19*     (2006.01)
    *H02J 7/02*     (2016.01)
    *H02J 3/00*     (2006.01)
    *H02J 3/14*     (2006.01)

(52) U.S. Cl.
    CPC ....... *B60L 11/1842* (2013.01); *B60L 11/1844* (2013.01); *G05D 23/1923* (2013.01); *G06N 5/04* (2013.01); *G06N 7/005* (2013.01); *H02J 7/02* (2013.01); *B60L 2240/70* (2013.01); *B60L 2240/80* (2013.01); *B60L 2260/50* (2013.01); *H02J 2003/007* (2013.01); *H02J 2003/146* (2013.01); *Y02E 60/721* (2013.01); *Y02T 10/7005* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01)

(58) Field of Classification Search
    USPC ......................................................... 320/109
    See application file for complete search history.

(56) References Cited

U.S. PATENT DOCUMENTS

| | | |
|---|---|---|
| 2011/0156651 A1 | 6/2011 | Christensen |
| 2011/0270476 A1 | 11/2011 | Doppler et al. |
| 2012/0169511 A1 | 7/2012 | Windstrup et al. |
| 2013/0024035 A1 | 1/2013 | Ito et al. |

OTHER PUBLICATIONS

International Preliminary Report on Patentability issued in corresponding application No. PCT/EP2014/068173 dated Dec. 4, 2015.
European Search Report issued in corresponding application No. 13 18 1909 dated Dec. 6, 2013.

* cited by examiner

METHOD FOR PROGRAMMING ENERGY FLOW BETWEEN A GRID AND AN ACCUMULATOR OF AN ELECTRIC VEHICLE, AND CORRESPONDING DEVICE FOR PROGRAMMING

TECHNICAL FIELD

The present invention relates to a method for programming energy flow between a grid and an accumulator of an electric vehicle, and more particularly to a method for recharging an accumulator of a rechargeable vehicle, for example an electric vehicle of the plug-in hybrid type, electric range-extender type, etc. In particular, the invention relates to a recharging method of the abovementioned type, aimed at reducing the recharging costs and ensuring intelligent and sustainable use of the electric power supply network, i.e. the grid.

The present invention also relates to a device for programming energy flow between an accumulator of an electric vehicle and the grid.

BACKGROUND

It is known that the increasingly widespread use of vehicles powered partly or entirely by means of electric power, for example vehicles with electric energy accumulators, poses the problem of managing in an intelligent manner recharging of the accumulators, preventing simultaneous requests for recharging from exceeding the supply capacity of an electric power supply network (grid), thus resulting in collapse of the network or impeding total or partial provision of the service.

In the case of inadequate power provision, the accumulator may not be sufficiently charged to be able to meet the user's needs at the time of use.

At the same time, requesting electric power during network load peak times is very disadvantageous for the user, since the cost of electric energy increases in line with the demand (during peak periods).

Methods for programming recharging of an accumulator for an electric vehicle, which envisage reading a residual charge level L of the accumulator, so that recharging may be delayed if need be, thereby reducing costs, are known. In other words, if the accumulator is connected to the supply network at a time when the cost of the energy is high and if the residual charge level L of the accumulator is not low, for example at 70%, recharging may be delayed by means of a timer which postpones it so that it is carried out in an economically more advantageous time band.

However, these methods have a number of drawbacks and limitations.

Firstly, they are not applicable on a large scale since, in order to read the residual charge level L of the accumulator, it is necessary to access the accumulator control system situated in the vehicle, which may vary depending on the model of the accumulator or on the vehicle on which it is mounted. Therefore, it is not a simple task to provide a device which is able to read indifferently the accumulators mounted on the various rechargeable vehicles which are in circulation or to install such a device at users' homes, where the accumulator is connected. Moreover, the device might not be compatible with accumulator models which have not yet been introduced onto the market.

Furthermore, even if the aforementioned interfaces are known and the abovementioned complex device is installed, it is not possible to avoid simultaneous requests for recharging from causing a network overload, thereby making it impossible to satisfy all the requests. On other hand, by attempting to reduce the costs for the user, the simultaneous recharging demand during the low consumption time bands may increase, thereby adversely affecting the supply network.

Furthermore, delaying recharging by means of a timer may prevent the accumulator from being completely charged for use.

Finally, the known methods, since they do not take into account the local state of the supply network, do not allow optimum use of renewable energy, for example photovoltaic energy, produced locally, for example at the premises where recharging of the accumulator is performed.

FIG. 1 is a graph showing the charged state of the accumulator, during recharging, as a function of the time, in a known system where charging starts immediately after connection of the accumulator to the electrical network, without reference to economic, tariff-related or electric network load aspects.

The continuous line in the graph indicates the charged state of the accumulator (y axis) as a function of the time (x axis). The broken line indicates the state of the vehicle charger performing charging between T0 and T1 and terminating charging after T1. The price of the energy (dotted line) is not taken into account in this known recharging system.

FIG. 2 is a graph showing the charged state of the accumulator, during recharging, again as a function of the time, in another known system where charging starts after a predefined period of inactivity. This system is useful for considering time bands in which the price of the energy is advantageous, for example low-cost two-hour tariffs. However, this system is limited by the fact that no check is carried out as to the load state of the supply network and the effect of accumulator recharging on the network load state. As indicated by the dotted line in FIG. 2, the charging system with timer is programmed to start charging at the time when the price of the energy is lower or decreasing.

US 2013/0024035 discloses a power supply system including a centralized power controller to control energy flow from a plurality of loads in a building through a monitor unit, the load further including an electric vehicle remotely connected by a plug in station.

The technical problem at the basis of the present invention is to devise a method and device for programming energy flow between the grid and an accumulator of a rechargeable vehicle which is able to reduce the recharging costs for the user but at the same time optimize use of the electric power supply network, without employing complex electronic devices designed ad hoc for the accumulators or for different models of electric vehicle, thus ensuring that the accumulator is substantially charged for subsequent use of the rechargeable vehicle, with the maximum economic advantage for the user and least stress on the network, overcoming the disadvantages and drawbacks which hitherto limit the recharging methods of the prior art.

SUMMARY OF THE INVENTION

The idea at the base of the present invention is to provide a device adapted to be plugged locally at the power supply network (grid), for instance to a power outlet at home, and adapted to be connected to an accumulator of an electric vehicle for programming a flow of energy between the grid and the accumulator.

The device implements a method for programming the energy flow, comprising the steps as claimed in claim 1. In particular, the method includes: —recording information on past usages of the accumulator locally at a point of connection of the accumulator to a grid; —locally estimating information on a future usage of the accumulator, taking in input the information on past usages; —locally programming an energy flow between the grid and the accumulator on the base of the estimated information.

More particularly, the device includes means to store a plurality of information associated to recharges of the electric accumulator, including when the accumulator is plugged or unplugged, how much power is requested between a plug and an unplug time, a load of the grid during the recharge, these information being representative of the user past recharges or user habits of recharge.

The device also includes means to estimate future usages of the electric accumulator, including when the accumulator will be plugged and unplugged, how much energy will be requested and used between estimated plug and unplug time, what will be the load of the grid during the future recharges, etc. . . . . The means to estimate take in input at least part of the information stored in the past and output the estimated future usage of the electric accumulator on the base of said stored information.

The device further includes means to schedule or programming a future recharge of the accumulator in order to optimize a target, wherein said programming is based on the estimated future usages of the vehicle. For instance, the target is a maximum reduction in the load of the network or a maximum reduction in the cost for the user or a combination of two or more targets, for instance the maximum reduction in the load of the network which is compatible with a maximum cost of reduction for the user and/or with a full recharge or a predetermined partial recharge of the accumulator within an estimated usage of the electric vehicle.

The device is stand alone, i.e. it does not require a communication interface to receive or send information from/to the grid, outside the place where the electric accumulator is connected. In this respect, the load of the network is calculated locally, measuring values of the current locally, and not in a control station of the grid. Similarly, the schedule of recharges to optimize the target, for instance to reduce the load of the network, is made locally. In the same way, the method according to the invention, is executed taking in consideration only information measured locally or estimated locally at the point of connection of the accumulator.

Advantageously, a real simplification in the recharges of electric vehicle, to the benefit of the grid and the user, may be obtained plugging the device locally to the point of connection for the recharge, and programming the recharges through the device.

In an aspect of the method of the present invention, information relating to the habits associated with recharging of an electric accumulator of a vehicle at each home or point for connection to the electric power supply network are collected and used in order to program the forthcoming recharging operations. In particular, the stored information is used to determine the time instant in which the user intends using his/her electric vehicle and then program recharging of the accumulator so that its charge level is substantially maximum before this time instant.

Advantageously, it is not required to know the connection interface of the accumulator or the electric vehicle or detect the residual charge level of the accumulator in order to program the next recharging operation.

In fact the electric power needed to perform recharging is provided on the basis of the historical data stored, namely on how much power has been used in the past in order to charge the accumulator before it is used. For example, the historical data comprises the specific days of the week, the amount of power required on these specific days and the time interval between connection and disconnection of the accumulator from the supply network for each specific day, and is recorded over a number of weeks.

The amount of power needed to raise the level of the accumulator to its maximum charge during the next recharging operation, for example by the coming Thursday, is substantially considered equivalent to or associated with the amount of power used and stored for that day during previous recharging operations. Similarly, on the basis of the stored data, it is possible to predict interruption of recharging during the following recharging operation and therefore program this recharging operation in order to reduce the network load or the recharging cost, while ensuring the maximum level of charge before the programmed interruption.

In one embodiment of the invention, the step of recording includes recording a time instant T0 or recharging start time T0, when the accumulator is connected to an electric power supply network for recharging; the step of estimating includes predicting a time instant T1 or next recharging end time T1, when the accumulator will be disconnected from said supply network, for use of the vehicle; and the step of programming includes recharging of the accumulator between the recharging start time T0 and the next recharging end time T1, where programming is performed so as to recharge fully the accumulator within the next recharging end time T1, reducing a network consumption load A and a recharging cost B by means of variation of the current drawn from the supply network, achieved if necessary also by means of power transfer from the vehicle accumulators to the supply network.

Programming is carried out so as to recharge completely the accumulator within the next recharging end time T1, reducing a network consumption load A and a recharging cost B, by means of variation the current drawn from the supply network.

According to other embodiments of the invention, the programming is carried out so as to partially recharge the accumulator, wherein the partial recharge is based on the historical values of recharges made in the past; indeed, on the base of historical information, even if the accumulator is not completely recharged, its energy is considered sufficient for satisfying the next usage of the user locally estimated.

According to one aspect of the invention, applicable to rechargeable vehicles equipped with a bidirectional charger, the network load is further reduced by allowing a flow of energy not only from the electricity network to the accumulators but also from the accumulators to the electricity network. The flow is therefore bidirectional.

In this respect, also the flows of energy from the accumulator to the grid are locally stored; thus, the stored information are on discharges of the accumulator, and not only on recharges. Accordingly, and similarly to what explained above, information of recharges and/or on discharges of the accumulator in the past are used to estimate future recharges and/or on discharges of the accumulator and to program the recharge and/or the discharge. In other words, the history of usages, i.e. the habits of the uses, not only include recharges of the accumulator but also discharges of the accumulator.

The past recorded usages comprise past recharges of the accumulator with energy taken from the grid and/or past discharges of the accumulator due to energy supplied to the grid.

The future estimated usages comprise future recharges of the accumulator with energy that will be taken from the grid and/or future discharges of the accumulator for energy that will be supplied to the grid.

Programming energy flow comprises programming absorption of energy from the grid to the accumulator and/or programming absorption of energy from the accumulator to the grid. More particularly, programming the energy flow includes changing or interrupting one or more time the recharge and/or the discharge of the accumulator to optimize a target in the usages of the accumulator, for instance reducing a load of the grid and/or reducing a cost for the user and/or providing a full or predetermined recharge of the accumulator. According to another aspect of the invention, a plurality of time instants or end times of recharging operations performed in the past are stored, and prediction of the next recharging end time T1 is carried out on the basis of these past recharging end times.

In one embodiment, the next recharging end time T1 is determined by means of a moving average or a weighted moving average of the past recharging end times.

In another embodiment, the next recharging end time T1 is determined by means of a data mining or machine-learning technique which uses as input data on the past recharging end times.

In a further embodiment, the next recharging end time T1 is associated with a probability distribution formulated on the basis of the past recharging end times.

According to another aspect of the invention, a plurality of time instants or start times of recharging operations performed in the past are also stored.

An amount of electric power needed to perform complete recharging of the accumulator E by the next recharging end time T1 is calculated on the basis of a plurality of amounts of power drawn from the network in the past between the pluralities of time instants for starting recharging and the corresponding pluralities of recharging end times. In particular, programming is carried out so as to supply the amount of calculated energy E between the recharging start time T0 and the next recharging end time T1.

According to one embodiment, the amount of electric power needed to carry out complete recharging of the accumulator E within the next recharging end time T1 is determined by means of a moving average or weighted moving average of the amounts of power drawn from the network in the past. According to other embodiments, data mining or machine-learning techniques are also used for calculating or estimating the amount of electric power E, these using as input data the amounts of power drawn from the network in the past or formulating a probability distribution based on the amounts of power drawn from the network in the past.

According to the invention, the cost of supplying the electric power in hour or time bands is stored and recharging of the accumulator is programmed between the recharging start time T0 and the next recharging end time T1, with preference being given to the lower-cost hour bands. In particular, it is envisaged interrupting recharging of the accumulator in the higher-cost hour bands.

According to another aspect of the invention, the network consumption load B between the recharging start time T0 and the next recharging end time T1 is also predicted on the basis of the network consumption loads at various stored time instants between the time instants for starting recharging and the corresponding recharging end times measured in the past. It is envisaged that the load measurement is associated with a voltage measured at the accumulator and supply network connection point, i.e. at the user's home. In particular, the greater the voltage measured, the less the network is being used and therefore the more recharging of the accumulator is recommended. In other words, the voltage of the supply network or values associated therewith are stored, according to the method of the invention, as a network load state.

What disclosed above explicitly with reference to recharges, for instance recording the recharging start time (T0), predicting the next recharging end time (T1), and programming recharge between the recharging start time (T0) and the next recharging end time (T1), is also applied to discharges of the accumulator and is not repeated for conciseness.

In the case of vehicles equipped with bidirectional chargers it is envisaged being able to transfer power from the accumulators to the network if the voltage measured indicates a high network usage.

In accordance with that stated above, recharging is programmed between the recharging start time T0 and the next recharging end time T1 in the hour or time bands in which a lower current consumption load is expected. Further advantages of the recharging method according to the present invention will be clear from the description provided hereinbelow with reference to the accompanying drawings, provided solely by way of a non-limiting example.

DETAILED DESCRIPTION

Figure 1:
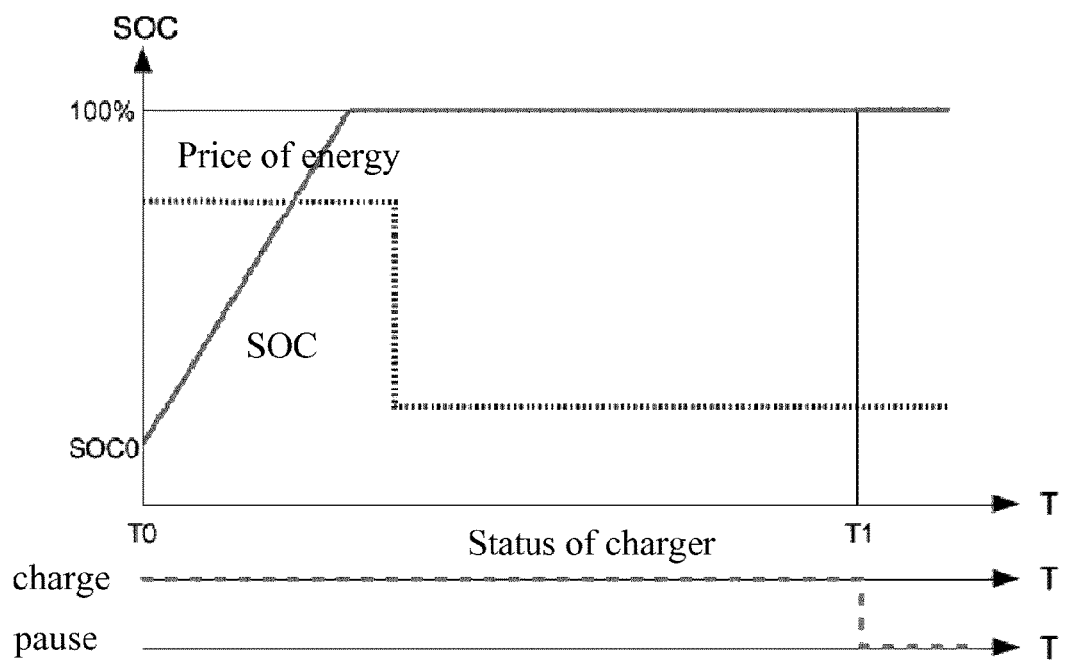
FIG. 1 is a diagram representing a method for programming energy flow of an accumulator of an electrical vehicle, according to the prior art.
Figure 2:
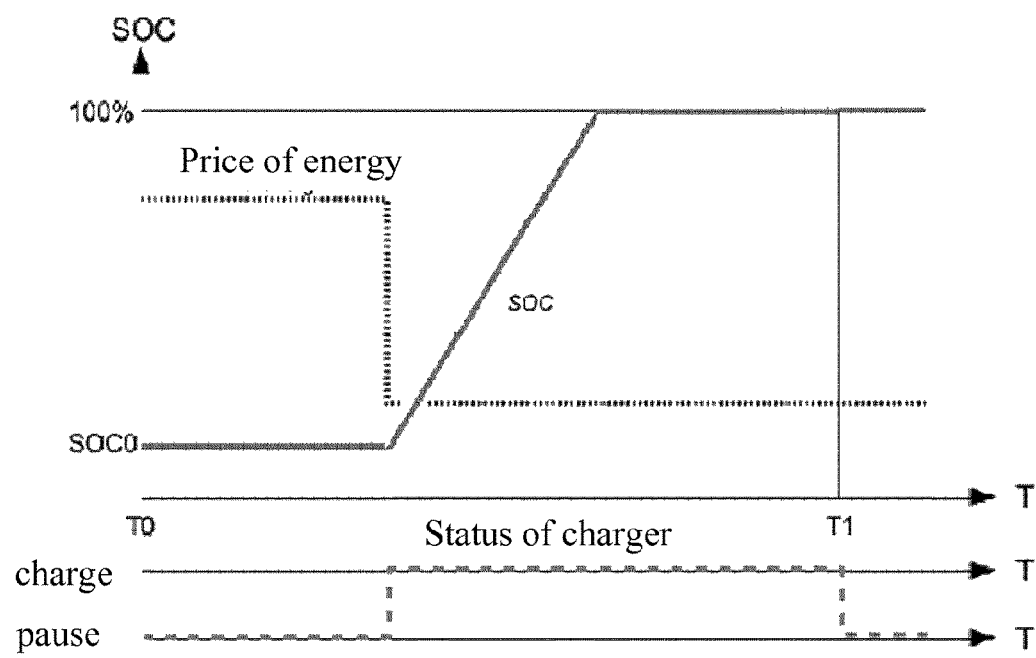
FIG. 2 is another diagram on energy flow of an accumulator, according to another prior art method for programming.
Figure 3:
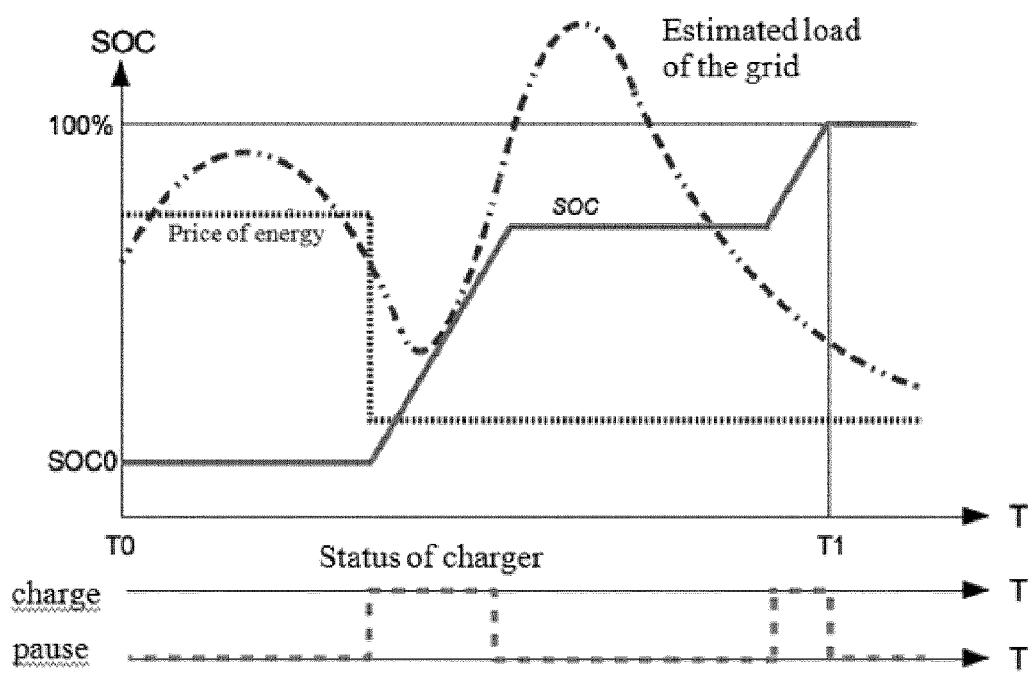
FIG. 3 is a diagram representing energy flow of an accumulator of an electrical vehicle, according to the method of the present invention.

With reference to FIG. 3, an example of execution of the method for programming energy flow in an accumulator of an electric vehicle according to the present invention is given.

More particularly, the example of FIG. 3 is related to recharging the electric accumulator. The method is however also applicable to different usages of the accumulator, for instance discharges of the accumulator, and includes the step of recording information on past usages of the accumulator locally at a point of connection of the accumulator to a grid; locally estimating information on a future usage of the accumulator, taking in input the information on past usages; and locally programming an energy flow between the grid and the accumulator on the base of the estimated information. Thus, what is described here below with specific reference to recharges may be similarly applied, for instance, to discharges.

According to an embodiment of the invention, the method is implemented by means of an algorithm which uses as input data a time instant T0 or recharging start time T0, when the accumulator is connected to an electric power supply network, for recharging, and a time instant T1 or next recharging end time T1, when the accumulator will be disconnected from the supply network, for use of the vehicle.

In particular, the algorithm programs recharging of the accumulator between the recharging start time T0 and the next recharging end time T1, recharging fully the accumulator within the next recharging end time T1 and at the same time reducing a network consumption load A and a recharging cost B by means of variation of the current drawn from the supply network.

Operation of the recharging method according to the present invention is schematically shown in the graph of FIG. 3. Recharging is planned between the instant T0 when the accumulator is connected and the instant T1 when disconnected, carrying out recharging at the time instants which are economically more advantageous (dotted line) and less demanding for the supply network (dot-dash line). The planning is economically more advantageous for the user and is less demanding for the supply network while ensuring that the completion of accumulator charging is effected before the disconnection instant T1.

Figure 4:
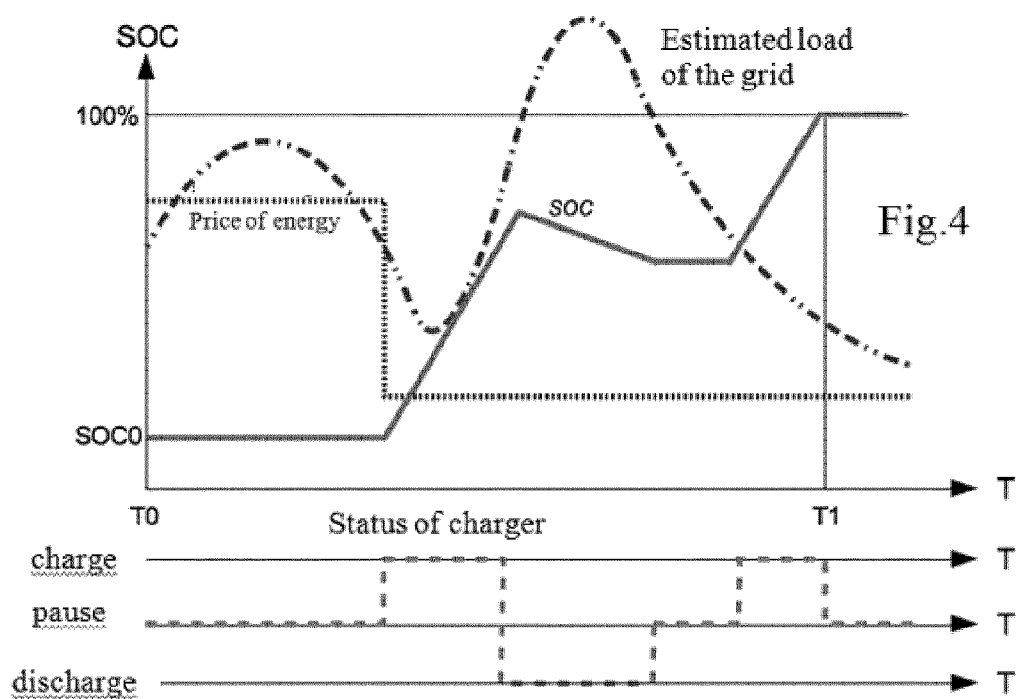
FIG. 4 is a diagram representing energy flow of an accumulator of an electrical vehicle, according to another embodiment of the present invention.

The graph in FIG. 4 illustrates schematically recharging according to the present invention in an embodiment where bidirectional chargers are used. In this case, in addition to the price of the energy (dotted line), the network state (dot-dash line) is also considered and a transfer of power from the accumulators to the supply network is performed (charger state="discharging"). The planning is economically advantageous for the user, since users may sell energy stored in the accumulator of their vehicles to the network, and is less demanding for the supply network, while still ensuring that charging is completed before the disconnection instant T1.

According to another aspect of the present invention, the optimization method may also envisage time intervals during which the charge is transferred from the accumulators to the network (grid).

In particular, the method according to the invention is implemented by means of an algorithm which uses the following as input data:

The connection instant T0
The predicted disconnection instant T1
The charged state of the accumulator at the connection instant (SOC0)
The price of the energy (or variation thereof) during the interval T0-T1
The supply network load (or variation thereof) during the interval T0-T1.

On the basis of the input data indicated above, the algorithm calculates planning of the accumulator charging. This calculation is carried out repeatedly between the instants T0 and T1. In particular, the frequency of execution of the algorithm between the instants T0 and T1 is parameterized. Repetition of the algorithm allows charging of the accumulator to be varied depending on any variations of the network load which might arise, for example an unexpected supply network load.

Among the input data indicated above, the connection instant T0 and the price of energy in the interval T0-T1 are known beforehand, in particular the connection instant T0 being recorded using a clock and the price of the energy being associated with a predetermined price plan.

The other inputs are estimated by means of prediction algorithms specifically designed by the Applicant and based on an analysis of pre-stored historical data.

Table 1 hereinbelow shows a number of historical data recorded during a 5-day time interval. The interval is provided exclusively by way of example and it is envisaged that storage may be performed in broader time intervals and in some cases considering specific characteristics in the interval in question, for example a specific day for each recording (for example, a working day or non-working day or Monday-Friday). SOC indicates the state of charge and is not calculated on a direct measure of the energy stored in the accumulator but on historical values of recharges stored in the past.

TABLE 1

| Day | SOC0 (%) | T0 (hh:mm) | T1 (hh:mm) | Network load (%) |
|-----|----------|------------|------------|------------------|
| 1 | 60% | 18:40 | 07:20 | [00:00, 00:15] 10%, . . . , [12:15, 12:30] 75%, . . . , [23:45-00:00] 10% |
| 2 | 50% | 19:40 | 07:25 | [00:00, 00:15] 12%, . . . , [12:15, 12:30] 65%, . . . , [23:45-00:00] 12% |
| 3 | 55% | 18:50 | 07:30 | [00:00, 00:15] 8%, . . . , [12:15, 12:30] 85%, . . . , [23:45-00:00] 11% |
| 4 | 70% | 17:50 | 06:50 | [00:00, 00:15] 11%, . . . , [12:15, 12:30] 55%, . . . , [23:45-00:00] 10% |
| 5 | 60% | 18:30 | 07:00 | [00:00, 00:15] 7%, . . . , [12:15, 12:30] 54%, . . . , [23:45-00:00] 10% |

On the basis of the data 1–n (n=5) shown in Table 1, the prediction algorithms calculate the input data required for planning recharging of the day n+1 (n=6, in the example of Table 1).

According to one embodiment, the input data is estimated by means of moving averages of the historical data. The result is for example shown in Table 2 hereinbelow. As mentioned, T0 is not calculated, but is known as a result of recording of the connection instant.

TABLE 2

| Day | SOC0 (%) | T0 (hh:mm) | T1 (hh:mm) | Network load (%) |
|-----|----------|------------|------------|------------------|
| 6 | 59% | —:— | 07:13 | [00:00, 00:15] 10%, . . . , [12:15, 12:30] 67%, . . . , [23:45-00:00] 10% |

According to another embodiment, the input data is based on probability estimates and then associated with probability distributions.

By way of example, Table 3 shows the input data predicted by means of a simple form of probability distribution, i.e. uniform distribution.

TABLE 3

| Day | SOC0 (%) | T0 (hh:mm) | T1 (hh:mm) | Network load (%) |
|---|---|---|---|---|
| 6 | 59 ± 2% | —:— | 07:13 ± 5 | [00:00, 00:15] 10± 2%, ..., [12:15, 12:30] 67 ± 4%, ..., [23:45-00:00] 10 ± 3% |

According to a further embodiment, the input data is associated with more complex probability distributions. For example, with reference to prediction of the value T1 alone, the prediction algorithm calculates the results shown in Table 4.

TABLE 4

| Day | T1 (hh:mm) |
|---|---|
| 6 | P (T1 < 7:00) = 5%<br>P (7:00 <= T1 < 7:15) = 45%<br>P (7:15 <= T1 < 7:30) = 45%<br>P (T1 >= 7:30) = 10% |

The recharging method according to the present invention is associated with four functional blocks or modules.
1. Module for predicting the network voltage, i.e. for predicting the load state of the network.
2. Module for predicting the end-of-charging time (T1)
3. Module for predicting the initial charged state of the accumulators (SOC0)
4. Scheduling module for defining the curve of the energy supplied to the vehicle as a function of the time during charging.

Three additional modules are also envisaged:
5. Scheduler implementation module
6. Network voltage recording and storage module
7. Module for recording and storing the charging operations including start-of-charging time (T0), end-of-charging time (T1) and energy supplied during charging (E).

Figure 5:
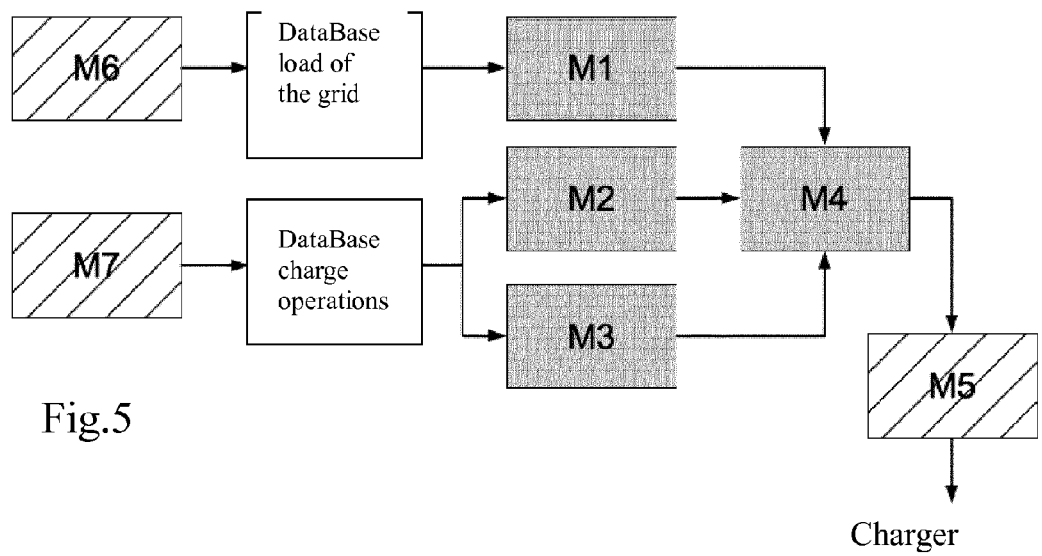
FIG. 5 is a diagram representing functional blocks to implement the method according to the present invention.

FIG. 5 illustrates schematically the interaction between the modules.

For each charging event the module M6 reads the network voltage during charging and stores it in a database; data in the database are used by module M1 which predicts the curve for the network voltage as a function of the time, expected during recharging.

M7 reads, for each charging event, the start-of-recharging and end-of-charging times, as well as the power drawn by the accumulators during charging and stores the values in a database; data in the database are used by M2 and M3 so as to predict, respectively, the time within which the accumulators must be fully charged (T1) and the initial charged state (SOC0).

M1, M2 and M3 provide the results of their predictions to M4 which, on the basis of the predicted network voltage profile, end-of-charging time, initial charged state and electric energy tariff profile, defines the charging curve (power supplied to the vehicle as a function of the time) which allows the costs and the network load to be minimized.

M5 converts the curve defined by M4 into electrical signals for operating the charging device. During charging, M6 continues to monitor the network state and, if the current state differs from the predicted state, M1 updates its predictions and, consequently, M4 also updates the charging curve.

Figure 6:
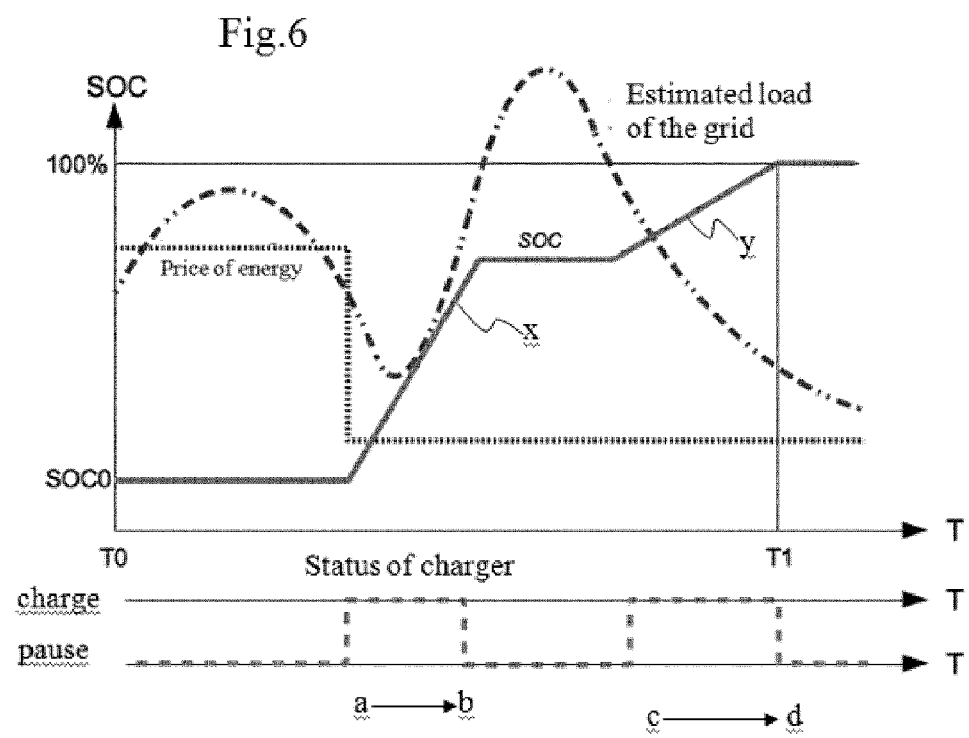
FIG. 6-7 are diagrams representing energy flows of an accumulator of an electrical vehicle, according to further aspects of the present invention.

FIG. 6 is a graph illustrating implementation of the method according to the present invention, in which optimization of recharging is performed by means of variation of the current drawn from the supply network, namely avoiding drawing current when there is a high network load and charging the accumulator when the network is not overloaded.

Differently from the embodiment described with reference to FIGS. 3 and 4, the accumulator may be programmed to absorb energy faster (slope x in FIG. 6) in a time interval a-b when the load of the grid is estimated to be low and to absorb energy more slowly (slope y, in FIG. 6) in a time interval c-d when the load of the grid in estimated to be higher. In this embodiment, the accumulator is adapted to change dynamically the amount of energy absorbed from the network. In other words, the rate of absorption of energy from the grid is varied.

Advantageously, the estimation of the load of the grid and the variation in absorption of energy in different time intervals (a-b or c-d) is made locally, in the accumulator.

A dynamic variation of energy supplied to the grid from a bidirectional accumulator may be similarly provided.

Figure 7:
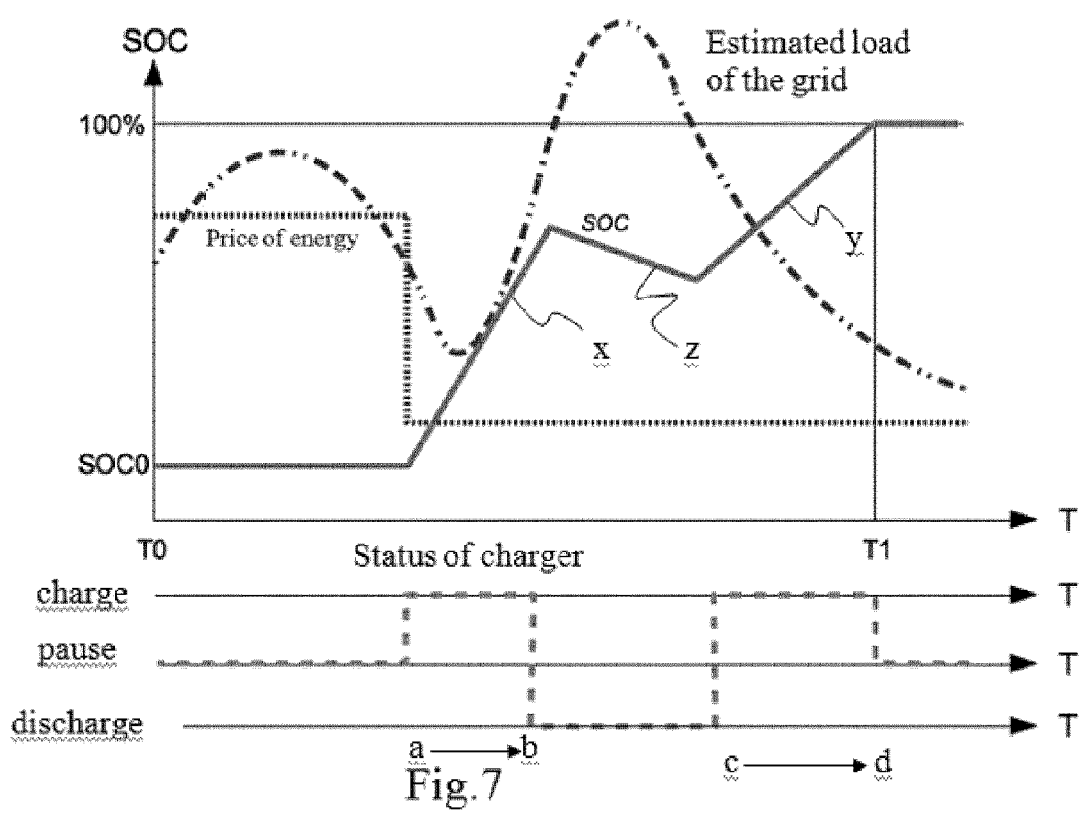

In this respect, FIG. 7 is another graph illustrating implementation of the method according to the present invention, in which optimization of charging is performed by means of variation of the current drawn from the supply network and, furthermore, by means of transfer of power from the accumulators to the supply network. The accumulator may be programmed to absorb energy faster (slope x in FIG. 7) in a time interval a-b when the load of the grid is estimated to be low, to absorb energy more slowly (slope y, in FIG. 7) in a time interval c-d when the load of the grid in estimated to be higher, and to supply energy in another time interval (for instance b-c) when the load of the grid if estimated to be highest. Also the amount of energy supplied (slope z) in different time intervals may be varied.

Figure 8:
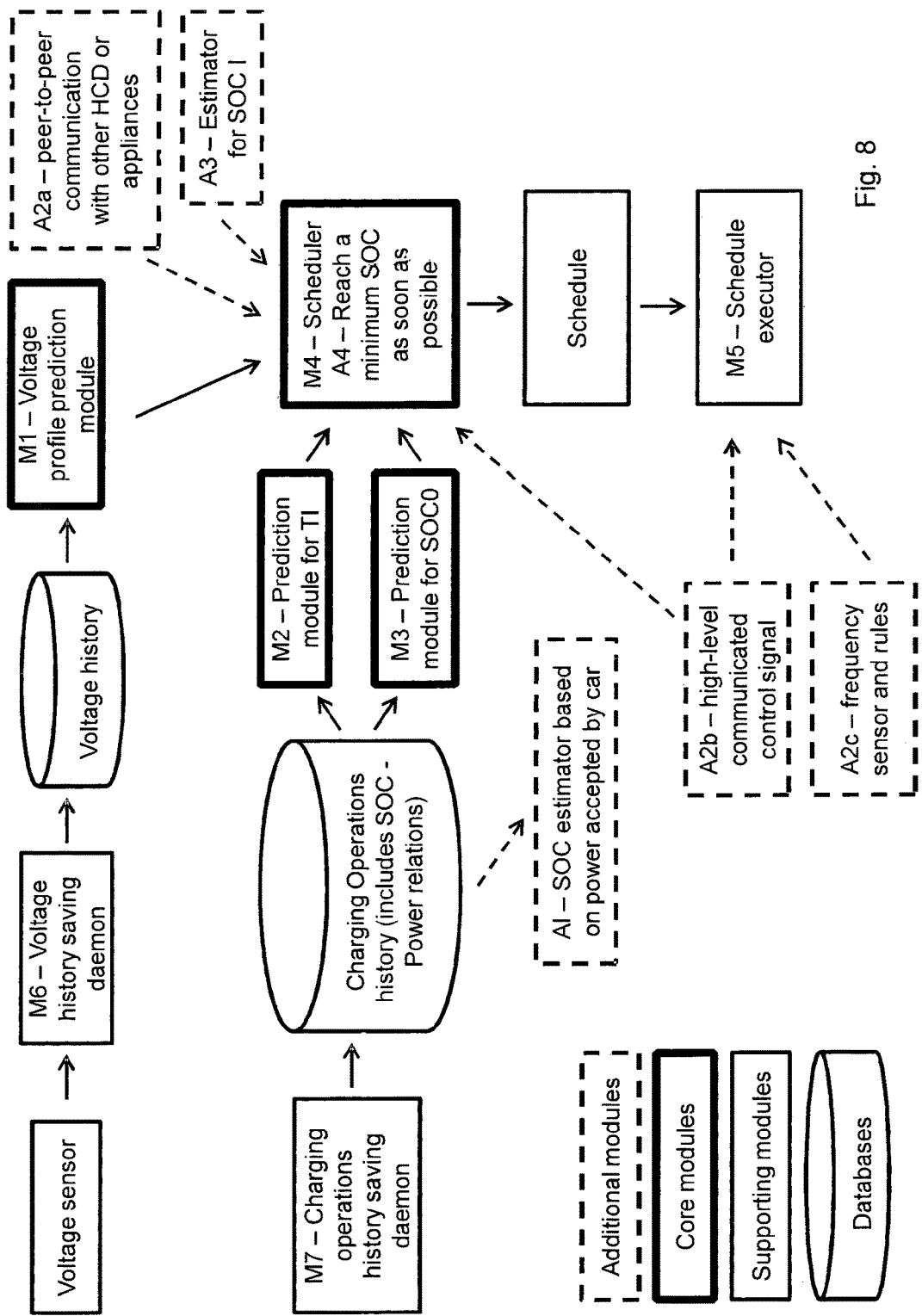
FIGS. 8-9 are diagrams representing functional blocks in more detail, for implementing the method of the present invention.
Figure 9:
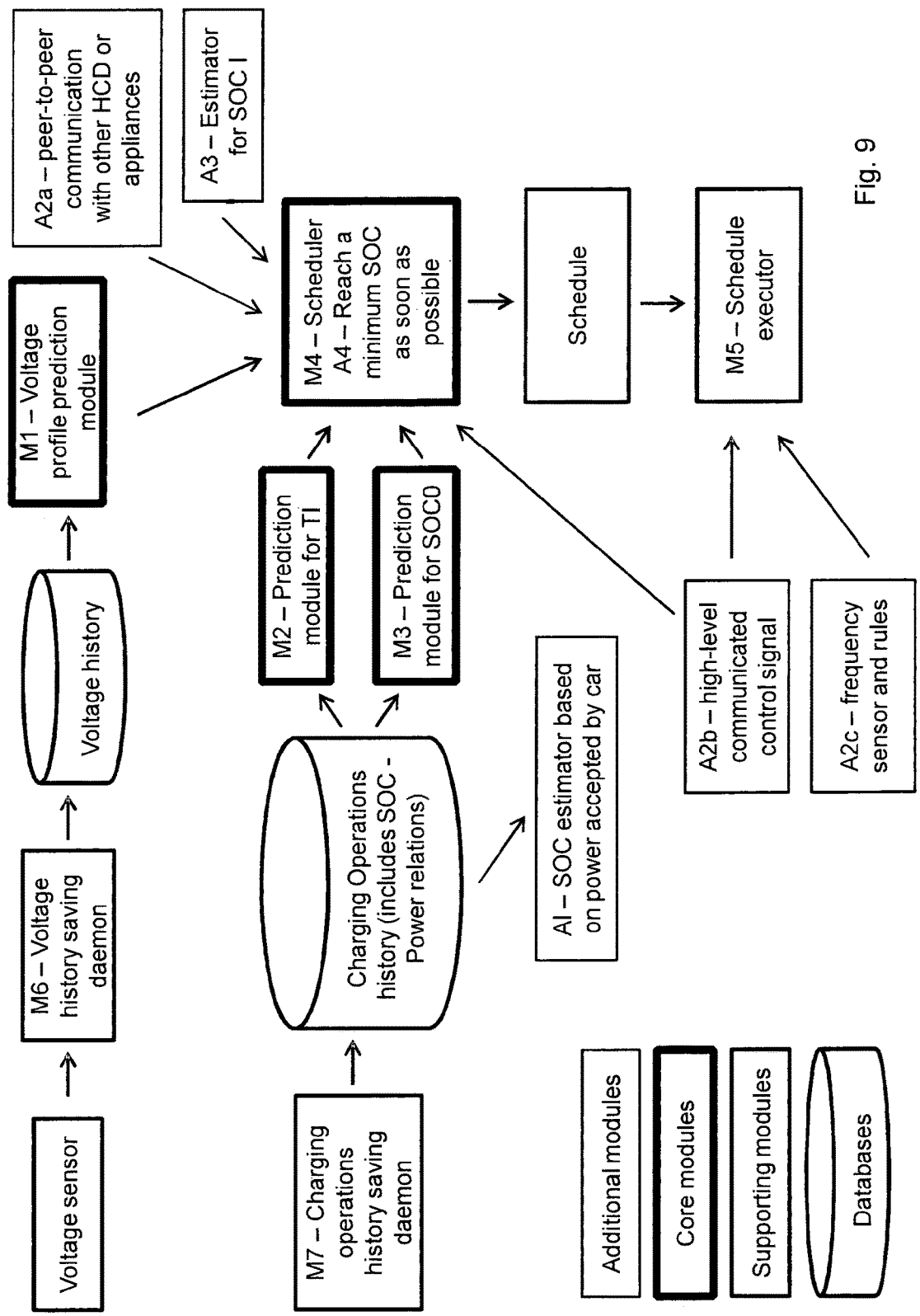

FIGS. 8-9 are diagrams representing functional blocks in more detail, for implementing the method of the present invention. The diagram of FIG. 8 is at high level and represents the four main blocks:
M1: Voltage profile prediction module for predicting the expected network load);
M2: Prediction module for T1;
M3: Prediction module for SOC0;
M4: Scheduler.
M5: Schedule executor;
M6: Voltage history saving daemon or past network load;
M7: Charging operations history saving daemon.
The modules interact as follows:
M6→voltage history→M1→M4;
M7→charging operation history→M2, M3→M4;
M4→schedule→M5.
The specification of each module is given here below.
Module M1 (Voltage Profile Prediction Module)
Inputs: the module M1 processes inputs from the whole available voltage history and integrates these inputs with the currently measured voltage.
Outputs: the module M1 produces a forecast voltage profile for the following H hours, where H is a predetermined parameter (e.g. 12 or 24). This represents an estimation of the expected network load.
Techniques: the module uses time series forecasting techniques (such as timeslot-based statistics).
Module M2 (Prediction Module for T1)
Inputs: the module processes inputs from the whole available history of charging operations.
Outputs: the module produces a prediction on T1 for the ongoing charging operation; the output is given when the electric vehicle is attached to the plug.

Techniques: the module will use classifiers or other machine learning techniques.

Module M3 (Prediction Module for SOC0, i.e. State of Charge when the Accumulator is Plugged)

Inputs: the module processes inputs from the whole available history of charging operations.

Outputs: the module produces a prediction on SOC0 for the ongoing charging operation. The output is given when the electric vehicle is attached to the plug. This information is used while the charging is ongoing in order to estimate the current SOC (state of charge).

Techniques: the module will use classifiers or other machine learning techniques.

Module M4 (Scheduler)

Inputs: the module takes inputs from M1, M2, M3.

Outputs: the module produces a charging schedule, where for each point of time in the future H hours, the amount of energy delivered to the electric vehicle is specified in order to meet the requirements.

Techniques: the module will use linear programming or other optimization techniques.

Module M5 (Schedule Executor)

Inputs: the schedule produced by M4.

Outputs: control signal for the current charging power.

M6 (Voltage History Saving Daemon)

Inputs: voltage readings from hardware.

Outputs: Timestamped voltage readings are saved, for instance, in a flat file (e.g. CSV format).

Techniques: Module takes care to delete outdated information and keep file size manageable.

Module M7 (Charging Operations History Saving Daemon)

Inputs: Power readings from hardware, events from hardware (plug/unplug)

Outputs: Timestamped information for each charging operation is saved in a flat file (e.g. CSV format). For each charging information, the following is saved:

T0→plug time

T1→unplug time

SOC1→any information on the state of charge at T1 (if available)

E→Total amount of energy delivered between T0 and T1

Some additional modules and functionalities may be implemented in the method and device according to the present invention. For instance, with reference to FIG. 9, some additional modules are provided.

Module A1:

SOC estimator based on power accepted by the electric vehicle. The estimate of the current SOC of the EV (electric vehicle) accumulator (battery) may be refined by considering the amount of energy that the vehicle is accepting. In particular, most EVs derate the maximum charging power when the SOC is close to 100%. Therefore, the information concerning the amount of power that the EV is drawing could be used to refine the SOC estimation.

However, the relationship between accumulator SOC and max charging power is not exactly specified and may change for different vehicles and also depending on temperature and a number of additional factors. Therefore, the "Charging Operations History" database is expected to contain information about past observed relations between SOC and Power accepted by the EV.

Inputs: actual power accepted by EV.

Outputs: probabilistic constraints on the current SOC of the EV. For example, if the current power accepted by the EV is the maximum charging power, the accumulator is estimated not to be charged more than 90%. This probabilistic information is used together with the information estimated by module M3 in order to produce a refined estimation.

Techniques: the relation linking the EV charging power and the actual SOC is estimated using historic information, as well as through some prior knowledge.

Module A2:

Additional information sources used for estimating the current or future state of the network.

A number of additional information sources (besides voltage) can be used in order to optimize the distribution network.

Module A2*a*:

Explicit (possibly wireless) communication between multiple devices according to the present invention, for instance belonging to different people or households, and/or other home appliances such as water heaters. In this case, all such appliances might coordinate in a distributed, peer-to-peer approach, for instance exchanging the planned load in the future.

Module A2*b*:

Explicit control signals communicated by an higher-level entity (such as the utility company) in order to assist the scheduling of the charging process or override instantaneous decisions. For example, the utility company may communicate that an excess of energy is predicted in a given future period, so the devices will schedule accordingly. According to another example, the utility company may communicate that the actual situation of the distribution network is critical (e.g. due to faults), so that the devices temporarily switch to idle (implementing appropriate mechanisms to avoid instabilities).

Module A2*c*:

Frequency information is used in order to react to temporary power shortages/excess at the level of the whole grid, by implementing appropriate mechanisms similar to those implemented for PV plant frequency-driven derating.

Module A3:

Estimator for SOC1

Instead of always charging the accumulator up to 100%, the device and method of the invention may attempt to estimate (based on information stored in the "Charging operations history") which is the amount of power effectively needed for the NEXT usage of the EV: in some cases, this may lead to improved performance as the charger will not attempt to charge the accumulator up to 100% when just a small amount of energy is needed for the next trip.

Inputs: Information in the "Charging operations history" database.

Outputs: Probabilistic information about the total amount of energy needed for the next trip of the car.

Techniques: Machine learning and data mining techniques.

Module A4:

Optimization of the charging schedule in order to always reach a given minimum charge as soon as possible.

The normal behaviour of the method is not to take care about the state of the accumulator prior to T1: as long as the SOC at T1 exceeds SOC1, all schedules are considered equally good. In practice, the device and method attempt to charge the accumulator up to a minimum, possibly configurable SOC (i.e. the amount of energy needed to get to the closest hospital and back) as soon as possible after plugging, in order to be ready for unforeseen events. This represents an additional constraint to the scheduler.

Hereafter, the advantages of the method and device according to the present invention are briefly summarised.

Owing to monitoring of the supply network, it is possible to achieve optimum use of renewable energy, for example photovoltaic energy produced locally, at the home where recharging of the vehicle is carried out. In fact, when renewable energy is available, the supply network is stressed less and the low stress level of the network allows optimization of the recharging operation.

Advantageously, the device of the present invention is stand alone, i.e. does not receive or transmit information to the network or grid and program the recharge of the accumulator only on the base of information measured, estimated on inputted locally, at the point of connection, for instance at a power outlet at home. The device is plugged at the point of connection or power outlet, for instance at home, and is adapted to receive a plug or connector of the electric accumulator; in other words, the device includes a double connection interface comprising a connection for the electric accumulator and a connector to the local point of connection to the grid.

Advantageously, the device does not require means for detecting power level of the accumulator, when it is plugged for recharge; indeed, the power level is estimated on the base of historical values stored in association with past recharges. For instance, if the accumulator is recharged for a long time Tx and absorbing a lot of current Cx in a past recharge, the power level Lx of the accumulator before such past recharge is considered to be very low; if the accumulator is recharged for less time Ty and absorbing less current Cy, the power level Ly of the accumulator before the corresponding past recharge is considered to be lower than Lx.

Advantageously, the method and device of the invention know (estimate) information associated to a next recharge of the accumulator in advance with respect to the next recharge, including how much energy will be required to the grid or to the local power supply, when the recharge will be started and stopped, what the level of recharge at stop time will be, what the load of the network will be, and program the next recharge on the base of the information estimated and to optimize a target. Further information, for instance inputted by a user or detected in real time by the method and device according to the invention may be used to improve the programming of recharge.

More information on past recharges is achieved and available in the device and method according to the invention, more precise and in advance the estimation may be done. The information on past recharges represents the user's habits of recharging and using the vehicle and future usages may be precisely calculated with algorithms. Advantageously, the programming of flow of energy between the accumulator and the grid is bidirectional, and includes charges and discharges of the accumulator. The bidirectional programming reduces the costs for the user and the load of the grid because energy produced locally, for instance with photovoltaic panels at home, may be used to recharge the accumulator for the next usage of the electric vehicle, without absorbing energy from the grid or absorbing the energy only partially from the grid, but may also be used to store energy in the accumulator to be supplied to the grid, when the load of the grid is high, and all this operations are programmed in advance, at the point of connection of the device, on the base of past information stored locally and on the base of estimation made locally.

The invention claimed is:

1. A method for programming an energy flow in an accumulator of an electric vehicle, the method comprising:

connecting a device to a local point of connection to an electric power supply network, the device being adapted to be connected to the accumulator and executing the following steps:

recording information on past usages of the accumulator locally at the local point of connection;

estimating information locally on a future usage of the accumulator, taking in input the information on past usages; and programming locally an energy flow between the electric power supply network and the accumulator based on the estimated information, wherein the recording includes recording a recharging start time when the accumulator is connected to the electric power supply network through the device for recharging;

wherein the estimating includes predicting a next recharging end time, when the accumulator to be disconnected from the electric power supply network for use of the electric vehicle, wherein the programming includes recharging the accumulator between the recharging start time and the next recharging end time, the programming being carried out so as to perform a complete recharging of the accumulator completely within the next recharging end time, reducing a load of the electric power supply network and a recharging cost, by a variation of current drawn from the electric power supply network, wherein the method further comprises:

predicting a load of the electric power supply network between the recharging start time and the next recharging end time, the predicting a load being carried out based on past measurements of loads of the electric power supply network between a pluralities of time instants for start of recharging and a corresponding pluralities of end times, wherein the load measurement is associated with a voltage measured at the accumulator and a supply network connection point, wherein the accumulator is programmed to absorb energy faster in a time interval when the load of the electric power supply network is estimated to be low and to absorb energy more slowly in a time interval when the load of the electric power supply network is estimated to be higher, and the accumulator is programmed to supply energy to the electric power supply network in a further time interval when the load of the electric power supply network if estimated to be highest, and to vary an amount of energy supplied in different time intervals, wherein a cost of supplying electric power in hour or time bands is stored and recharging is programmed between the recharging start time and the next recharging end time, with preference being given to lower-cost hour bands, the programming comprising interruptions of the accumulator recharging in higher-cost hour bands.

2. The method according to claim 1, wherein the recorded past usages comprise past recharges of the accumulator with energy taken from the electric power supply network and past discharges of the accumulator due to energy supplied to the electric power supply network, wherein estimated future usages comprise future recharges of the accumulator with energy that will be taken from the electric power supply network and future discharges of the accumulator due to energy that will be supplied to the electric power supply network, and wherein the programmed energy flow comprises absorbing energy from the electric power supply network to the accumulator or absorbing energy from the accumulator to the electric power supply network.

3. The method according to claim 2, wherein the programming an energy flow includes changing or interrupting one or more times the recharge and the discharge of the accumulator to optimize a target in the estimated future usages.

4. The method-according to claim 3, wherein the target includes reducing a load of the electric power supply network and reducing a cost for a user and providing a full or predetermined recharge of the accumulator.

5. The method according to claim 1, further comprising storing a plurality of time instants or end times of recharging operations performed in the past and in that the prediction of the next recharging end time is determined based on the end times of recharging operations performed in the past.

6. The method-according to claim 5, wherein the prediction of the predicting a next recharging end time is determined by a moving average or a weighted moving average of the end times of recharging operations performed in the past.

7. The method according to claim 5, wherein the prediction of the predicting a next recharging end time is determined by a data mining or machine-learning technique receiving in input data of the past recharging end times.

8. The method according to claim 5, wherein the prediction of the predicting a next recharging end time is associated with a probability distribution formulated based on the past recharging end times.

9. The method according to claim 1, further comprising storing a plurality of time instants or start times of recharging operations performed in the past.

10. The method according to claim 9, wherein an amount of electric power needed to perform the complete recharging of the accumulator within the next recharging end time is calculated based on a plurality of amounts of electric power drawn from the electric power supply network in the past between the pluralities of time instants for starting recharging and the corresponding pluralities of time instants or end times for recharging, the programming being carried out so as to supply the calculated amount of electric power between the recharging start time and the next recharging end time.

11. The method according to claim 10, wherein the amount of electric power needed to perform the complete recharging of the accumulator within the next recharging end time is determined by a moving average or a weighted moving average of the amounts of electric power drawn from the network in the past or by a data mining or machine-learning technique which receives in input data of the amounts of electric power drawn from the electric power supply network in the past or by a probability distribution formulated based on the amounts of electric power drawn from the network in the past.

12. The method according to claim 1, further comprising programming recharging between the recharging start time and the next recharging end time in the hour or time bands in which a lower current consumption load is expected.

13. The method according to claim 1, wherein the step of recording includes storing power absorbed for recharging the accumulator in the past and the step of estimating includes estimating a state of charge of a battery based on the power absorbed in the past.

14. A device for programming an energy flow in an accumulator of an electric vehicle, the device comprising:
means to record information on past usages of the accumulator at a local point of connection of the accumulator to an electric power supply network;
means to locally estimate information on a future usage of the accumulator, taking in input the information on past usages; and
means to locally program an energy flow between the electric power supply network and the accumulator based on the estimated information,
wherein the device is adapted to be connected to the accumulator and to the local point of connection, and wherein
the means to record is programmed for recording a recharging start time when the accumulator is connected through the device to the electric power supply network for recharging;
the means to locally estimate is programmed for predicting a next recharging end time, when the accumulator to be disconnected from the electric power supply network for use of the electric vehicle,
the means to locally program performs programming recharging the accumulator between the recharging start time and the next recharging end time so as to completely recharge the accumulator within the next recharging end time, reducing a load of the electric power supply network and a recharging cost, by a variation of a current drawn from the electric power supply network,
the means to locally estimate further performs a prediction of a load of the electric power supply network between the recharging start time and the next recharging end time, the prediction of the load being calculated based on past measurements of loads of the electric power supply network between a pluralities of time instants for start of recharging and a corresponding pluralities of end times,
wherein each past measurement of a load is associated with a voltage measured at the accumulator and at an electric power supply network connection point,
wherein the device programs the accumulator to
absorb energy faster in a time interval when a load of the electric power supply network is estimated to be low and to absorb energy more slowly in a time interval when a load of the electric power supply network is estimated to be higher,
supply energy to the electric power supply network in a further time interval when a load of the electric power supply network is estimated to be highest, and to vary an amount of energy supplied in different time intervals,
wherein the device stores a cost of supplying electric power in hour or time bands and programs recharging between the recharging start time and the next recharging end time, with preference being given to lower-cost hour bands, the programming recharging comprising interruptions of the accumulator recharging in higher-cost hour bands.

15. The device according to claim 14, wherein the means to record stores past recharges of the accumulator with energy taken from the electric power supply network and past discharges of the accumulator for energy supplied to the electric power supply network, wherein the means to locally estimate forecasts future recharges of the accumulator with energy that will be taken from the electric power supply network and future discharges of the accumulator due to energy that will be supplied to the electric power supply network, and wherein the means to locally program schedules when energy is to be absorbed from the electric power supply network or from the accumulator.

16. The device according to claim 15, wherein the means to locally program programs the future recharge and the discharge changes or interrupts one or more times the recharge and discharge of the accumulator to optimize a target in the future recharge and the future discharge.

\* \* \* \* \*